US008327646B2

(12) United States Patent
Johnson et al.

(10) Patent No.: US 8,327,646 B2
(45) Date of Patent: Dec. 11, 2012

(54) FORWARD SLEEVE RETAINER PLATE AND METHOD

(75) Inventors: Thomas Edward Johnson, Greer, SC (US); James Thomas Brown, Piedmont, SC (US)

(73) Assignee: General Electric Company, Schenectady, NY (US)

(*) Notice: Subject to any disclaimer, the term of this patent is extended or adjusted under 35 U.S.C. 154(b) by 543 days.

(21) Appl. No.: 12/656,951

(22) Filed: Feb. 22, 2010

(65) Prior Publication Data

US 2010/0154436 A1 Jun. 24, 2010

Related U.S. Application Data

(62) Division of application No. 11/402,857, filed on Apr. 13, 2006, now Pat. No. 7,681,403.

(51) Int. Cl.
*F02C 1/00* (2006.01)

(52) U.S. Cl. .......... 60/772; 60/796

(58) Field of Classification Search .......... 60/752, 60/772, 796–800

See application file for complete search history.

(56) References Cited

U.S. PATENT DOCUMENTS

| | | | | |
|---|---|---|---|---|
| 2,494,659 | A | 1/1950 | Huyton | |
| 2,592,060 | A | 4/1952 | Oulianoff | |
| 4,413,470 | A | 11/1983 | Scheihing et al. | |
| 4,567,730 | A | 2/1986 | Scott | |
| 5,361,577 | A | 11/1994 | Cromer | |
| 5,400,586 | A | 3/1995 | Bagepalli et al. | |
| 5,419,114 | A | 5/1995 | Bauermeister et al. | |
| 6,412,268 | B1 | 7/2002 | Cromer et al. | |
| 6,484,505 | B1 | 11/2002 | Brown et al. | |
| 2005/0050902 | A1* | 3/2005 | Anichini et al. | 60/800 |
| 2005/0262845 | A1* | 12/2005 | Martling et al. | 60/752 |
| 2006/0032237 | A1 | 2/2006 | Aumont et al. | |
| 2006/0242965 | A1 | 11/2006 | Shi et al. | |
| 2007/0130958 | A1 | 6/2007 | Ohri et al. | |
| 2007/0240423 | A1 | 10/2007 | Bulman et al. | |
| 2007/0251240 | A1 | 11/2007 | Johnson et al. | |

FOREIGN PATENT DOCUMENTS

JP 2004-037035 2/2004

OTHER PUBLICATIONS

Japanese Office Action dated Oct. 18, 2011, issued in corresponding Japanese Application No. 2007-103589 with spot translation.

* cited by examiner

*Primary Examiner* — Phutthiwat Wongwian
(74) *Attorney, Agent, or Firm* — Nixon & Vanderhye PC

(57) ABSTRACT

In a combustor section, wherein a forward sleeve is disposed to encircle a leading end of an impingement sleeve comprised of first and second impingement sleeve parts abutted along a longitudinal junction thereof, a retainer member disposed to overlie the longitudinal junction. The retainer member is welded to at least one of said forward sleeve and the impingement sleeve. The retainer member has first and second axial end edges disposed transverse to the longitudinal junction, and at least one of the axial end edges has a cutout defined therein and disposed to overlie the longitudinal junction.

9 Claims, 4 Drawing Sheets

FORWARD SLEEVE RETAINER PLATE AND METHOD

CROSS-REFERENCE TO RELATED APPLICATION

This application is a Division of application Ser. No. 11/402,857, filed Apr. 13, 2006, the entire contents of which are hereby incorporated by reference into this application.

BACKGROUND OF THE INVENTION

The present invention relates to the mechanical design of a retainer plate for a combustor transition piece forward sleeve.

FIG. 1 schematically depicts a typical combustor 10 in cross-section. As can be seen, in this example, the transition piece 12 includes a radially inner transition piece body 14 and a radially outer transition piece impingement sleeve 16 spaced from the transition piece body 14. Upstream thereof is the combustion liner 17 and the combustor flow sleeve 18 defined in surrounding relation thereto. The encircled region is the transition piece forward sleeve assembly 20. When assembling the impingement sleeve, the impingement sleeve parts are aligned and held at the split seam thereof. Conventionally, a retainer plate 22 is disposed at the forward joint where the impingement halves come together and is welded to the forward sleeve to help hold the halves of the impingement sleeve tightly together. The forward sleeve mounting plate 22 typically found on transition pieces is a simple, rectangular-shaped plate.

BRIEF DESCRIPTION OF THE INVENTION

Current forward sleeve retainer plates experience cracking at the beginning of the weld bead. Applicant has recognized that this cracking is due to high concentrated stresses.

The present invention provides a forward sleeve retainer plate configuration that lowers the stresses at the beginning of the fillet weld bead, where there is a built in crack, by sheltering the beginning of the weld bead from stress, and thus prevents the assembly from cracking. The proposed configuration also helps to spread out the load over a larger distance. Thus, the invention employs specific stress concentration reducing geometries to a structural plate in order to minimize the stress concentration effect from being imparted into an undesirable location of the attachment weld.

Thus, the invention may be embodied in a method of retaining impingement sleeve parts in a gas turbine combustor, comprising: providing an impingement sleeve comprised of abutted impingement sleeve parts, a junction of said impingement sleeve parts extending longitudinally along said impingement sleeve; disposing a forward sleeve to substantially encircle a forward end of the impingement sleeve; disposing a retainer member to overlie at least a portion of a length of said junction, said retainer member having first and second axial end edges and first and second side edges, said side edges being disposed generally in parallel with said junction and said axial end edges being disposed substantially transverse to said junction; and welding said retainer member to at least one of said impingement sleeve and said forward sleeve, wherein at least one of said axial end edges of said retainer member has a cutout defined therein, said retainer member being disposed and welded so that said cutout generally overlies said junction.

The invention may also be embodied in the combination of, in a gas combustor section, a forward sleeve disposed to substantially encircle a leading end of an impingement sleeve, the impingement sleeve being comprised of first and second impingement sleeve parts abutted along a longitudinal junction thereof; and a retainer member disposed to overlie at least a portion of said longitudinal junction, said retainer member being welded to at least one of said forward sleeve and said impingement sleeve, said retainer member having first and second axial end edges and first and second side edges, said side edges being disposed generally in parallel with said longitudinal junction and said axial end edges being disposed substantially transverse to said longitudinal junction, wherein at least one of said axial end edges of said retainer member has a cutout defined therein, said retainer member being disposed and welded so that said cutout generally overlies said longitudinal junction.

The invention may further be embodied in a gas turbine combustor section comprising: a transition piece including a transition piece body and an impingement sleeve disposed in surrounding relation thereto, said impingement sleeve comprising at least first and second impingement parts abutting along a spit seam; a combustion piece comprised of a combustion liner and a flow sleeve disposed in surrounding relation thereto; and a retainer member disposed to overlie at least a portion of a length of said split seam, said retainer member having first and second axial end edges and first and second side edges, said side edges being disposed generally in parallel with said split seam and said axial end edges being disposed substantially transverse to said split seam, and wherein at least one of said axial end edges of said retainer member has a cutout defined therein, said retainer member being disposed so that said cutout generally overlies said split seam.

BRIEF DESCRIPTION OF THE DRAWINGS

These and other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
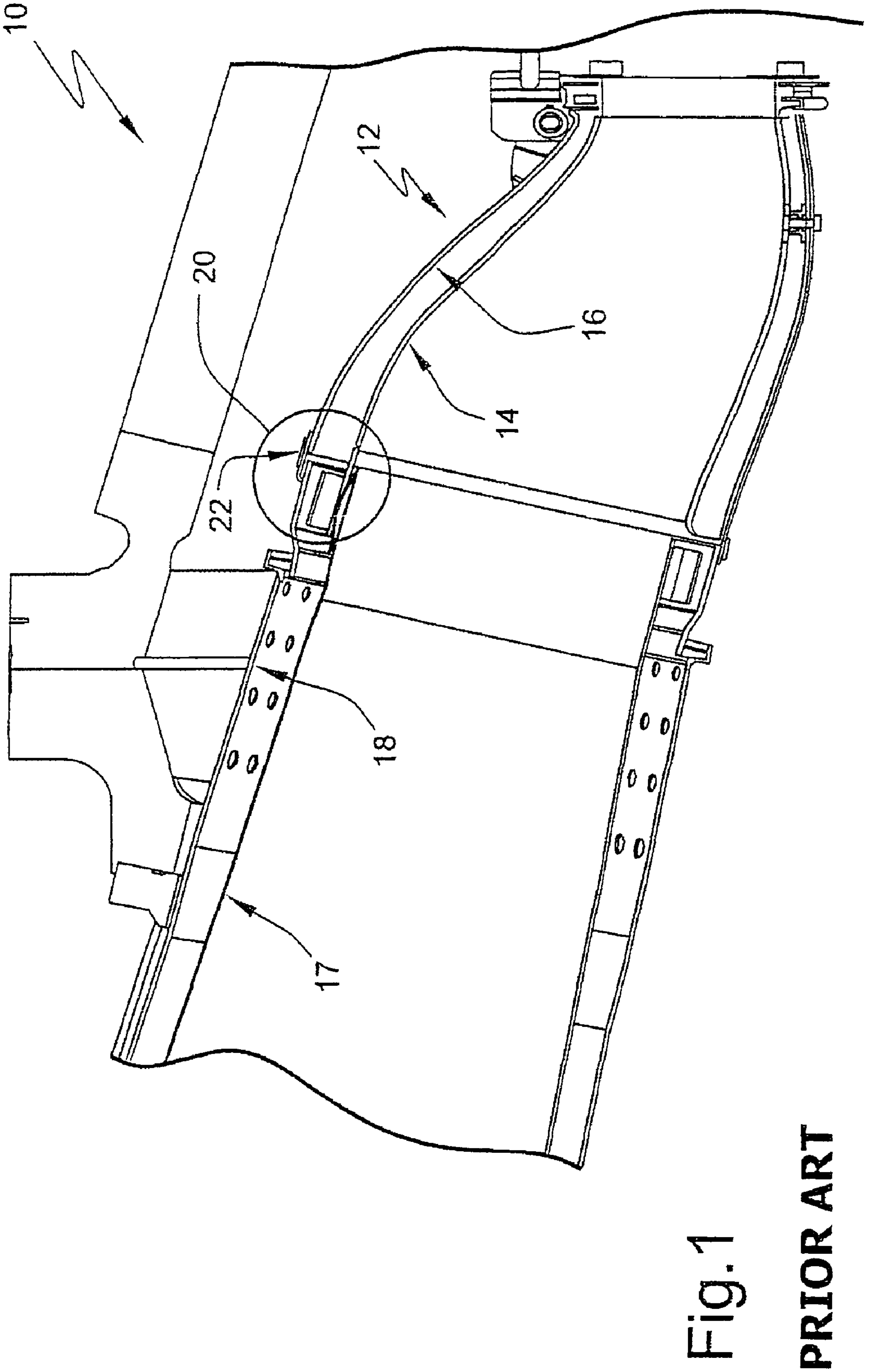
Fig.1 PRIOR ART
FIG. 1 is a partial schematic illustration of a gas turbine combustor section.

As noted above, FIG. 1 shows a typical combustor cross-section and major components of the combustor system are identified therein. The forward sleeve area is circled at 20 and cross-sectional views of example configurations thereof are provided in FIGS. 2 and 3. A forward sleeve retainer plate embodying the invention may be incorporated in either of said cross-sectional geometries and others. Thus, in FIGS. 2 and 3, like reference numerals are used to identify structures corresponding to those discussed with reference to FIG. 1 and reference numerals incremented by 100 indicate corresponding but structurally different parts.

Figure 2:
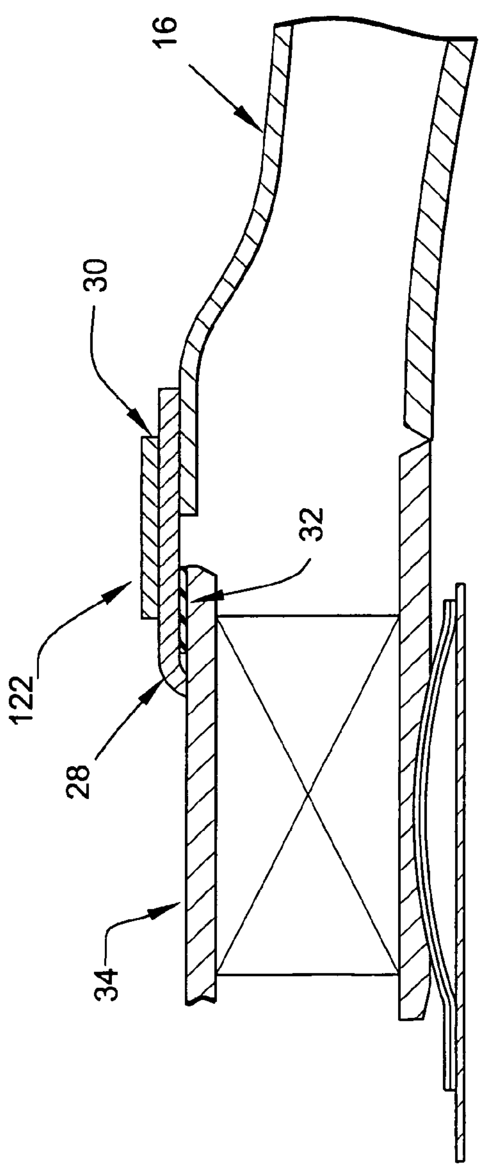
FIG. 2 is a first example forward sleeve cross-section geometry in which the invention may be incorporated.

Referring to FIG. 2, the transition piece forward sleeve assembly is the junction of the forward sleeve land 34 and the impingement sleeve 16. As illustrated therein, and as also understood from the perspective view of FIG. 4, the impingement sleeve parts 24,26 are abutted to define the impingement sleeve 16. The forward sleeve 28 is disposed to encircle the leading end of the impingement sleeve 16 and the forward sleeve retainer plate 122 is welded to the forward sleeve as at 30 to hold the forward sleeve and hence the two halves of the impingement sleeve 16 tightly together. In the configuration of FIG. 2, seal wear pads 32 are provided between the forward sleeve 28 and the forward sleeve land 34. Seal wear pads 32 are small pieces of metal that act as wear pads.

Figure 3:
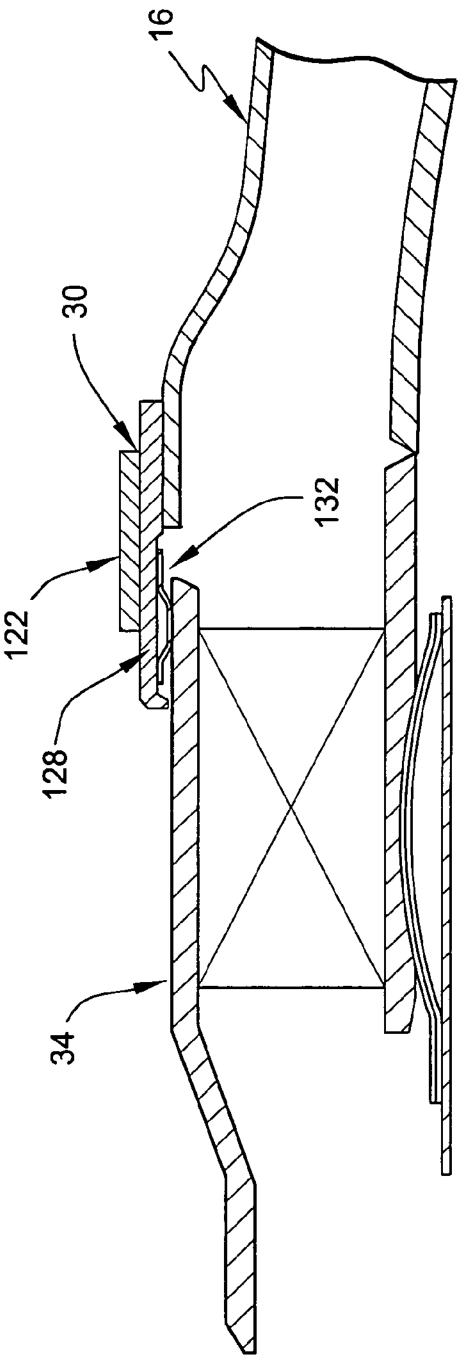
FIG. 3 is a second example forward sleeve cross-sectional geometry in which the invention may be incorporated.

FIG. 3 depicts an alternate configuration of a forward sleeve assembly 20. In this embodiment, a hula type wear seal 132 is disposed between the forward sleeve 128 and forward sleeve land 34. As illustrated the forward sleeve 128 of the FIG. 3 embodiment is recessed to accommodate the hula type wear seal 132. The forward sleeve retainer plate 122 configuration can be the same for each of the FIG. 2 and FIG. 3 assemblies. Further, the retainer plate of the invention can be included in other forward sleeve to forward sleeve land junctions without departing from the scope of this invention.

Figure 4:
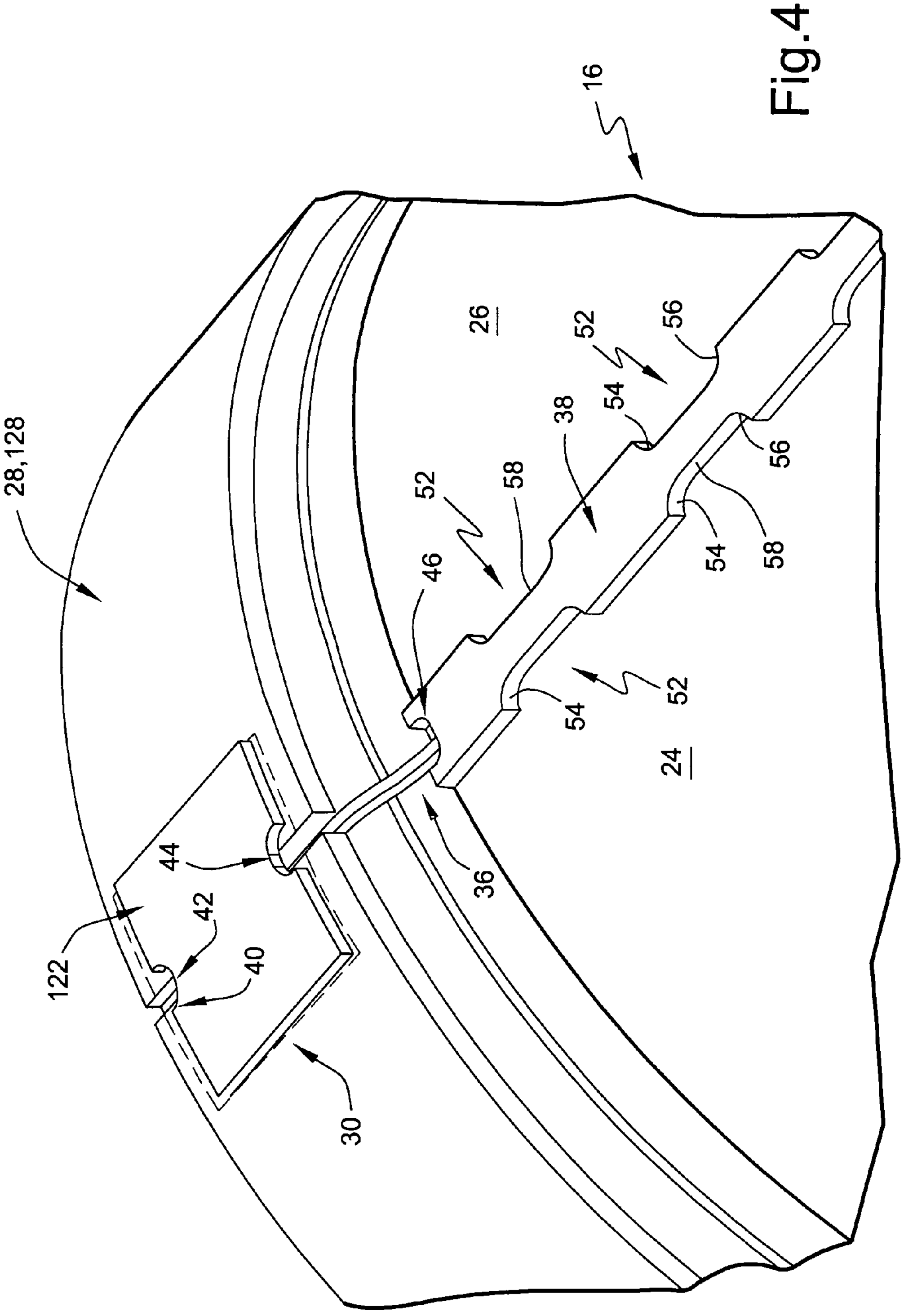
FIG. 4 is a partial, perspective view of a forward sleeve retainer plate according to an example embodiment of the invention.

Referring to FIG. 4, an improved forward sleeve retainer plate 122 embodying the invention is illustrated in greater detail. As noted above, the impingement sleeve 16 is comprised of impingement sleeve halves 24,26 that are abutted as at 36 to define a split seam.

As illustrated, the seal retainer plate is disposed to overlie the longitudinal junction (split seam) 36 of the impingement sleeve halves 24,26. To this end, the retainer plate 22 is welded to the forward sleeve 28,128 as schematically illustrated at 30, around its outer periphery on respective sides of the split seam.

Figure 5:
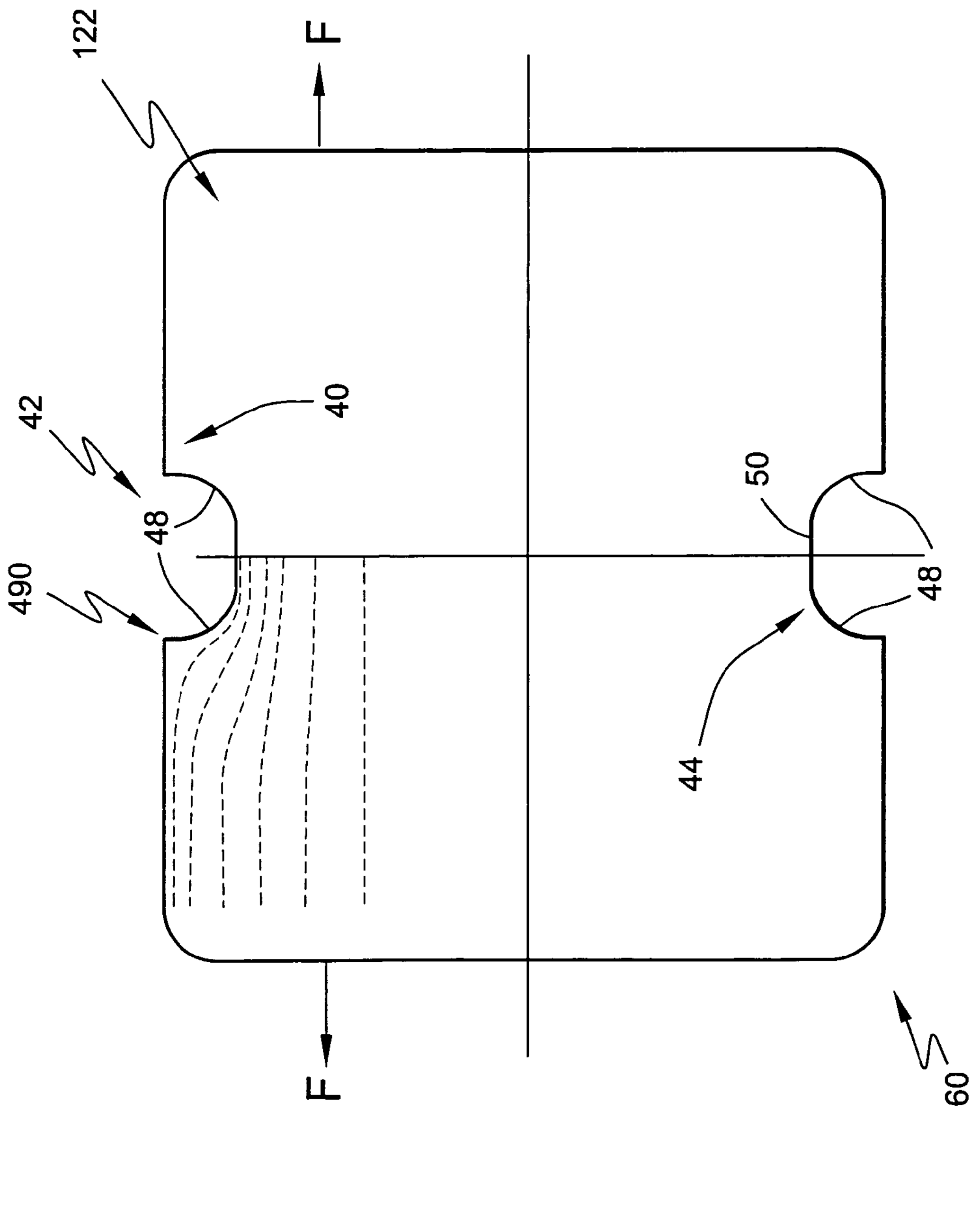
FIG. 5 is a plan view of a forward sleeve retainer plate as an example embodiment of the invention, illustrating in part a stress field therein.

As noted above, applicant recognized that the conventional simple, rectangular retainer plate experiences cracking at the beginning of the weld bead due to high concentrated stresses. Referring to FIGS. 4 and 5, reference 40 identifies the outside corner where the fillet weld is typically started. This location is the area where the highest stresses would be seen on a conventional rectangular plate. Fillet welds in a structural application are generally not considered desirable because there is a built in crack between the two items being joined. One particularly bad area of the fillet weld configuration is the initiation point where the weld starts. This is because of the high rate of transition in the geometry of the parts and the resultant stress concentration.

The improved sleeve retainer plate 122 of the invention lowers the stresses at the beginning of the fillet weld bead by including a stress relief feature in the form of a cutout 42,44 having a curved profile on at least one of the leading and trailing ends of the retainer plate. As schematically illustrated in FIG. 5, in response to forces tending to separate the impingement sleeve halves as illustrated at "F", a stress field is formed in the retainer plate. Due to the stress reducing cutout(s) 42,44, however the stress field, (a part of which is schematically illustrated with dashed lines) is formed wherein the stress field is distributed so as not to concentrate and cause cracking in the plate.

A zipper strip 38 (FIG. 4) is further disposed to overlie the junction of the impingement sleeve halves. The zipper strip is continuously welded along each side. In an example embodiment of the invention, the leading end of the zipper strip also includes a stress relief feature, illustrated at 46, in the form of a cutout having a curved profile. The stress relief feature is defined at the axial end(s) of the zipper strip where the end of the zipper strip overlies the junction of the impingement sleeve parts to redistribute the forces due to pressures on the impingement sleeve. This reduces stress concentration particularly at the initiation point of the fillet weld provided between the zipper strip and the impingement sleeve parts. The zipper strip illustrated in FIG. 4 is elongated having spaced recesses 52 on each side thereof, along the length thereof. As illustrated, the recesses 52 have respectively curved leading 54 and trailing 56 ends, which also reduces stress concentration, and a straight portion 58.

In the illustrated embodiment, as noted above, the stress relief features 42, 44, 46 are curved cutouts. More specifically, in the illustrated examples, the cutouts 42, 44, 46 are substantially continuously curved as at 48 from the outer periphery of the plate or zipper strip inwardly, but include a generally straight portion 50 parallel to the outer side edge. However, other stress relief feature configurations may be provided including a continuously curved cutout, semi-circular cutout, or the like.

FIG. 4 schematically depicts the retainer plate 122 as having corners that are substantial right angles. It is to be understood that rather than straight corners, the retainer plate can be formed with curved corners as depicted at 60 in the FIG. 5 embodiment.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of retaining impingement sleeve parts in a gas turbine combustor, comprising:

providing an impingement sleeve comprised of abutted said impingement sleeve parts, a junction of said impingement sleeve parts extending longitudinally along said impingement sleeve;

disposing a forward sleeve to substantially encircle a forward end of the impingement sleeve;

disposing a retainer member to overlie at least a portion of a length of said junction, said retainer member having first and second axial end edges and first and second side edges, said first and second side edges being disposed generally in parallel with said junction and said first and second axial end edges being disposed substantially transverse to said junction; and welding said retainer member to at least one of said impingement sleeve and said forward sleeve, wherein at least one of said first and second axial end edges of said retainer member has a cutout defined therein, said retainer member being disposed and welded so that said cutout generally overlies said junction.

2. A method as in claim 1, wherein said cutout is substantially continuously curved.

3. A method as in claim 1, wherein said cutout is generally semi-circular.

4. A method as in claim 1, wherein said cutout is substantially continuously curved from said at least one of said first and second axial end edges of said retainer member to a base of said cutout.

5. A method as in claim 4, wherein said base of said cutout is substantially parallel to said at least one of said first and second axial end edges.

6. A method as in claim 1, wherein said retainer member is shorter in said axial direction than in a direction transverse thereto.

7. A method as in claim 1, wherein said retainer member is elongated in said axial direction.

8. A method as in claim 1, wherein the cutout is defined in each of said at least one of said first and second axial end edges of said retainer member and said retainer member is disposed and welded so that said cutouts each overlie said junction.

9. A method as in claim 8, wherein each said cutout is substantially continuously curved from said respective axial end edge to a respective base thereof.

* * * * *